Patented Aug. 16, 1932

1,872,216

UNITED STATES PATENT OFFICE

WILLIAM HENRY APPLEBY, OF LONDON, ONTARIO, CANADA

CHILD'S VEHICLE

Application filed April 24, 1930. Serial No. 447,046.

This invention relates to a child's play article, and my object is to devise a construction which may be used either as a vehicle in which the child may be drawn, as a kiddy car or push car, as a toddler or walker, or as a rocking chair in which the child may rock himself. A further object is to devise a connection for the tongue or handle by which the vehicle is drawn which is quickly disconnectible without loosening nuts or screws. A yet further object is to facilitate turning movements of the vehicle without making its movements too erratic when propelled either forward or backward.

I attain my object by means of a construction which may be briefly described as follows. A pair of rockers are suitably connected. From their concave sides extend benches connected by a bolster to which a seat is detachably secured. To the ends of the rockers at their concave side are connected ground wheels, of which three are preferably swivelled and the fourth fixed in position. The tongue or handle is removably secured to an attachment link which is pivotally connected to a cross bar at the front of the vehicle.

Figure 1:
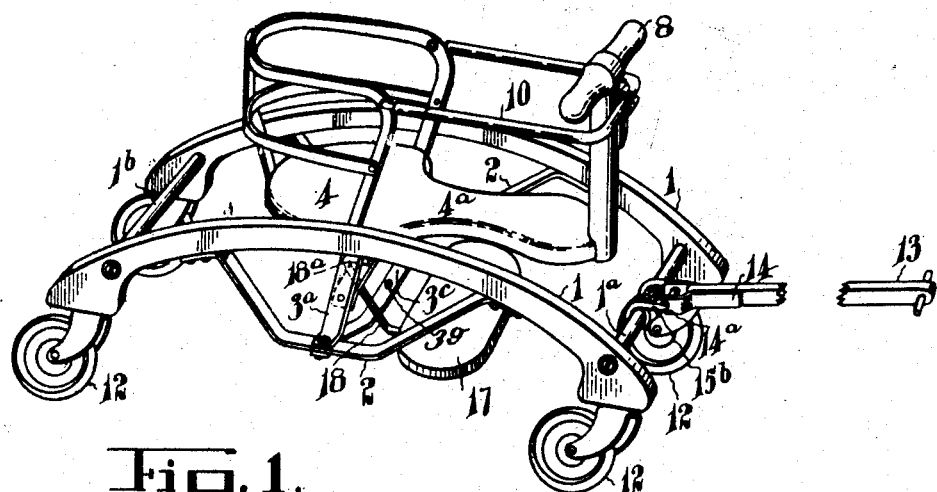
Figure 2:
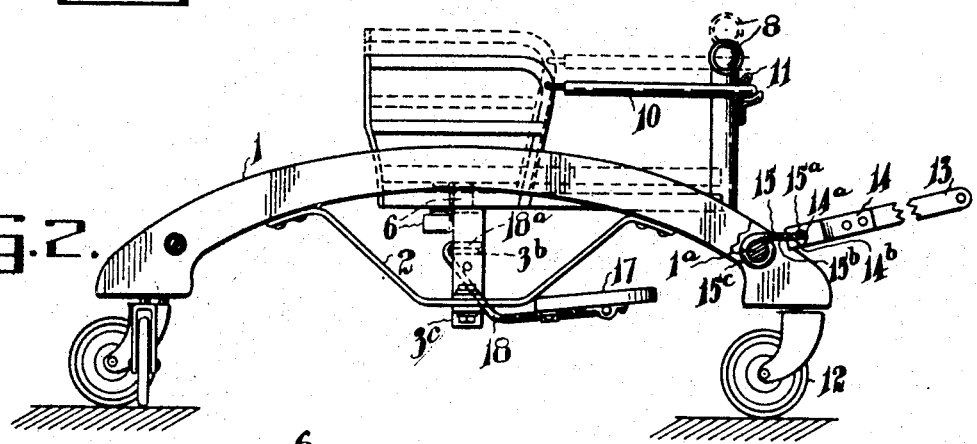
Figure 3:
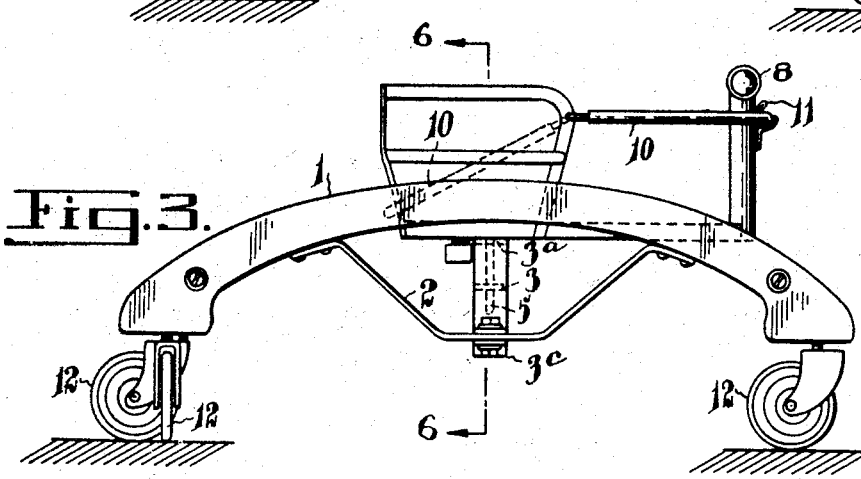
Figure 4:
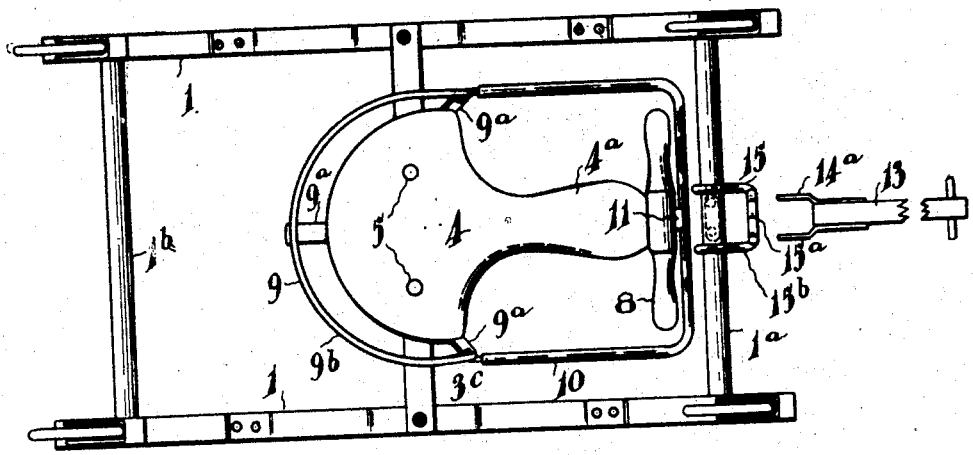
Figure 5:
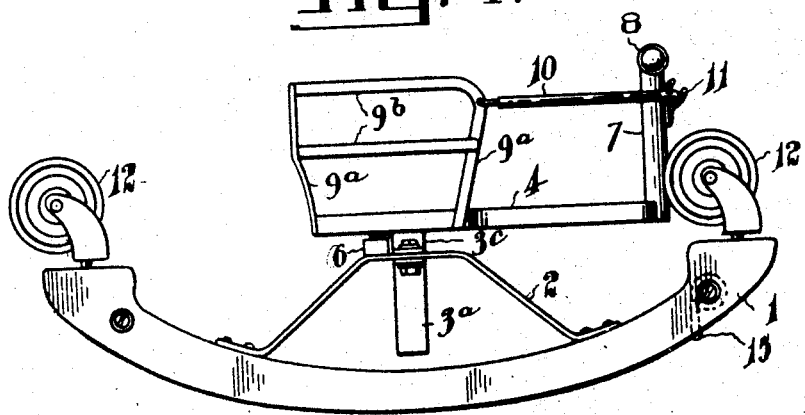

The invention is hereinafter more specifically described and is illustrated in the accompanying drawings in which Fig. 1 is a perspective view of the device showing it set up for use as a carriage;

Fig. 2 a side elevation thereof showing in dotted lines the seat in raised position;

Fig. 3 a side elevation of the device with the handle and foot rest removed showing it arranged for use as a kiddy car or walker;

Fig. 4 a top plan view of the device used as a rocking chair;

Fig. 5 a side elevation of the device as shown in Fig. 4; and

Figure 6:
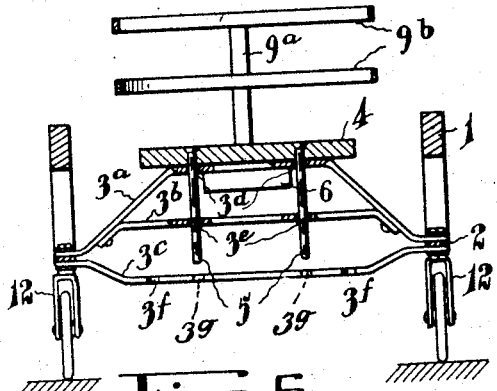

Fig. 6 a cross section on the lines 6—6 in Fig. 3.

In the drawings like numerals of reference indicate corresponding parts in the different figures.

1, 1 are rockers which are connected at front and rear by cross bars $1^a$ and $1^b$ respectively. Benches 2, 2 are secured by means of screws or bolts to the concave side of the rockers. A bolster 3 is secured to the benches 2, 2 by means of a bolt and comprises three parallel bars $3^a$, $3^b$ and $3^c$, the central bar $3^d$ extending directly across the benches and the bars $3^a$ and $3^c$ being located at equal distances above and below the said central bar.

A saddle-shaped seat 4 having a narrowed front portion $4^a$ which may be straddled by the user, has pins 5, 5 extending from the bottom thereof. Three series of holes $3^d$, $3^e$ and $3^g$ are provided in the parallel bars $3^a$, $3^b$ and $3^c$ of the bolster 3. The holes in each series are in alinement and form in effect sockets which are adapted to receive the pins 5, 5. The pins 5, 5 are sufficiently long to extend through the holes in the upper and central bars or through the holes in the lower and central bars, depending on the manner in which the device is used, as hereinafter explained.

Beneath the seat and adjacent the bolster 3, when the seat is in position on the device is a hinged block 6. Normally this block is swung back into an inoperative position, but if it is desired to raise the seat it may be swung forward between the pins 5, 5 whereby it engages the bolster 3 when the seat is in position, thus raising the seat above its normal position a distance equal to the thickness of the block 6.

At the forward end of the narrowed portion $4^a$ of the seat an upright post 7 is secured having a cross bar or handle 8.

The seat 4 is provided with a back 9 comprising three uprights $9^a$, $9^a$ and $9^a$, one at each side of the seat and one on the rear thereof, and two horizontal semi-circular bars $9^b$, $9^b$ connected to said uprights. In the preferred construction shown the two uprights connected to the seat are formed integrally with the upper semi-circular bar $9^b$.

A rubber covered guard 10 is pivotally connected to the back 9 at a point adjacent the junction of the upper semi-circular bar $9^b$ and the two front uprights. This guard is U-shaped and is adapted to be swung backwards behind the back 9 when not in use or forward over the handle 8 to be engaged in a catch 11 located on the front of the post 7 near the top thereof. This guard is used particularly when the device is used as a conveyance or rocker for very young children.

Casters 12 or swivelled ground wheels are located at each end of the rockers on their concave side. One of these is preferably fixed in position by means of a pin which passes through the spanner fork of the caster into the end of the rocker. Having one fixed caster prevents undue swaying or sidewise motion when the device is being pulled.

A handle 13 is provided having at one end a bail 14 having formed therein open bearings 14$^a$ having restricted openings 14$^b$. A U-shaped attachment link 15 comprises a base 15$^a$, legs 15$^b$ and eyes 15$^c$ formed therein and embracing the cross bar 1$^a$. The base 15$^a$ is oblong in cross section, and is adapted to be received in the open bearing 14$^a$. In order to insert the base 15$^a$ into the bearing 14$^a$ the handle 13 must be placed at right angles to the legs 15$^b$, when the narrow side of the base 15$^a$ is presented to the restricted opening 14$^b$ of the bearing 14$^a$ and may thus be inserted therein. When the handle is pulled out substantially parallel with the legs 15$^b$ of the attachment link 15, the latter is connected securely with the bail 14, and the device may be pulled along as desired. The parts are easily disconnected by reversing the process above described. This connection while permitting the handle to hinge up and down does not permit lateral movement. A block or spacer between the legs of the link 15 retain it in a central position on the cross bar 1$^a$.

A portable foot rest 17 is provided having supports 18, 18 which are secured to the under side thereof and are bent upwardly and forwardly to form hook-shaped ends 18$^a$, 18$^a$. The hook-shaped ends 18$^a$, 18$^a$ are adapted to be hooked over the central parallel bar 3$^b$ and the lower part of the support 18 rests against the lower bar 3$^c$. At this point semi-circular depressions 3$^f$ are formed in the lower parallel bar 3$^c$ to position the foot rest 17.

When the device is used as a carriage it is placed with the casters 12 on the ground and the seat 4 is mounted on the upper bar 3$^a$ of the bolster 3. The handle 13 is attached as described to the forward cross bar 1$^a$, and the device may be drawn thereby. The foot rest 17 may be attached as described, when the vehicle is used for a young child, or, in the case of an older child, the front cross bar 1$^a$ may be used as a foot rest. Likewise in the case of a younger child the guard 10 may be swung forward and engaged with the catch 11. If it is desired to use the device as a kiddy car or push car the handle 8 and the foot rest 17 are removed and the child propels the device by moving its feet upon the ground. When used thus as a kiddy car the guard 10 is preferably swung back out of operative position. For very young children the device may be used as a toddler or walker with the guard 10 swung forward into its operative position, thus enclosing the child and preventing it from falling.

If it is desired to use the device as a rocking chair the seat is removed and the device is turned upside down so that it rests on the convex side of the rockers. The handle 8 and the foot rest 17, being likewise, of course, removed when the device is to be used in this way. The seat is then mounted on the lower bar 3$^c$ of the bolster 3, the pins 5, 5 extending through the holes 3$^g$ and 3$^e$ in the bars 3$^c$ and 3$^b$, being the reverse of the position in which the seat is mounted when the device is used as a carriage. In this position the guard 10 may be used or not according to the age of the child.

It will be seen from the above description that I have devised a construction which satisfactorily achieves the objects referred to in the preamble hereof.

What I claim as my invention is:

1. A vehicle comprising rockers; a bolster extending between the rockers; a seat adapted to be mounted on the bolster; and wheels carried by the rocker ends, said vehicle being adapted to be carried by the wheels or to be inverted to rock on the rockers, the seat being adapted to be mounted on the bolster in either position of the rockers.

2. A vehicle comprising rockers; a bolster extending between the rockers, said bolster comprising a plurality of bars having aligned holes extending therethrough; a seat adapted to be mounted on the bolster; a pin secured to the seat and extending therebelow, and adapted to pass through the holes in the bolster; and wheels carried by the rocker ends.

3. A vehicle comprising rockers; benches secured to the concave sides of the rockers; a bolster connected to said benches and extending between the rockers, said bolster comprising a plurality of bars having aligned holes extending therethrough; a seat adapted to be mounted on the bolster; a pin secured to the seat and extending therebelow, and adapted to pass through the holes in the bolster; and wheels carried by the rocker ends.

4. A vehicle comprising rockers; a detachable seat mounted between the rockers and having a narrowed front portion which may be straddled; and wheels carried by the rocker ends, the said vehicle being adapted to be carried by the wheels or to be inverted to rock on the rockers, the seat being adapted to be mounted on the vehicle in either position of the rockers.

5. A vehicle comprising rockers; a detachable seat mounted between said rockers; and caster wheels carried adjacent the rocker ends, one of said casters being fixed in position and the others being free to revolve, and the said vehicle being adapted to be carried by the wheels or to be inverted to rock on the rockers, the seat being adapted to be mounted on the vehicle in either position of the rockers.

6. A vehicle comprising wheels; a frame; a bolster extending between the side members of the frame, and comprising a plurality of substantially parallel bars; a foot rest; and a support for said foot rest, said support having a hooked end adapted to hook over one of the parallel bars, the lower portion of the support being adapted to engage another of the parallel bars.

7. A vehicle comprising rockers; a bolster extending between the rockers, said bolster comprising a plurality of bars having aligned holes extending therethrough; a seat adapted to be mounted on the bolster; a pin secured to the seat and extending therebelow, and adapted to pass through the holes in the bolster; a hinged block in the under side of the seat adapted to be swung into and out of a position between the seat and the bar upon which it is mounted; and wheels carried by the rocker ends.

8. A vehicle comprising a frame, including rockers; wheels carried by the frame, said vehicle being adapted to rock on the rockers or to be inverted to run on the wheels; a removable seat; supporting means for the seat on the frame; and means on the seat adapted to removably engage said supporting means from either of the opposite sides thereof, whereby the seat may be mounted in an upright position on the vehicle in either position of the frame.

9. A vehicle comprising a frame, including rockers; wheels carried by the frame, said vehicle being adapted to rock on the rockers or to be inverted to run on the wheels; a removable seat; supporting means for the seat on the frame having sockets therein; means on the seat including depending legs adapted to enter the sockets in the said supporting means from either of the opposite sides thereof, whereby the seat may be mounted in an upright position on the vehicle in either position of the frame.

Signed at Toronto, Canada, this 16th day of March, 1930.

WILLIAM HENRY APPLEBY.